July 22, 1958 — E. GARAVENTA ET AL — 2,843,919
COLD ROLLING METHOD OF MAKING HOLLOW STEEL BLADES
Filed Dec. 30, 1952 — 2 Sheets-Sheet 1
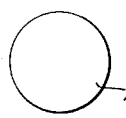
FIG.1
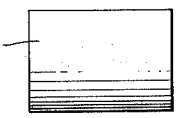
FIG.2
BILLET
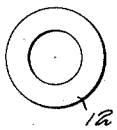
FIG.3
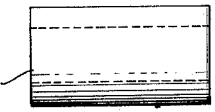
FIG.4
PIERCED BILLET
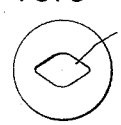
FIG.5
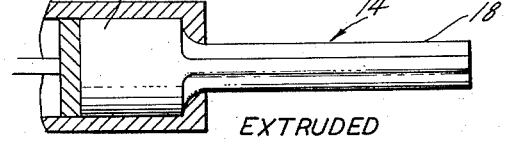
FIG.6
EXTRUDED
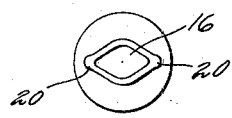
FIG.7
FIG.8
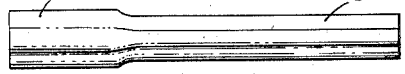
FIG.9
SHANK MACHINED
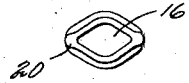
FIG.10
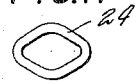
FIG.11
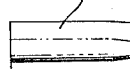
FIG.12
COLD ROLLED
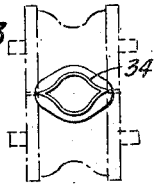
FIG.13
FIG.14
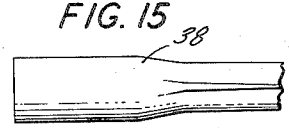
FIG.15
SHANK ROUNDED
FIG.16
FIG.17
SHANK SWAGED
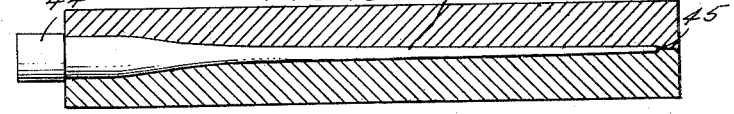
FIG.18
PRESSED
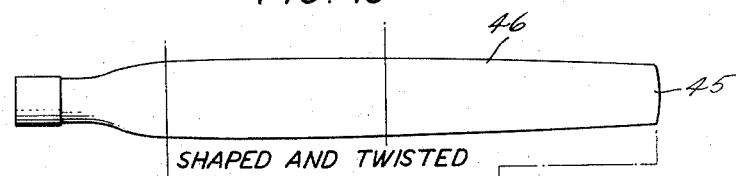
FIG.19
SHAPED AND TWISTED
FIG.20  FIG.21  FIG.22
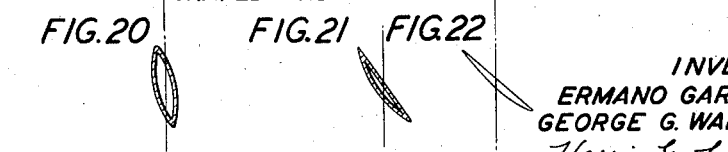
INVENTORS
ERMANO GARAVENTA
GEORGE G. WALKER JR.
BY Harris G. Luther
ATTORNEY

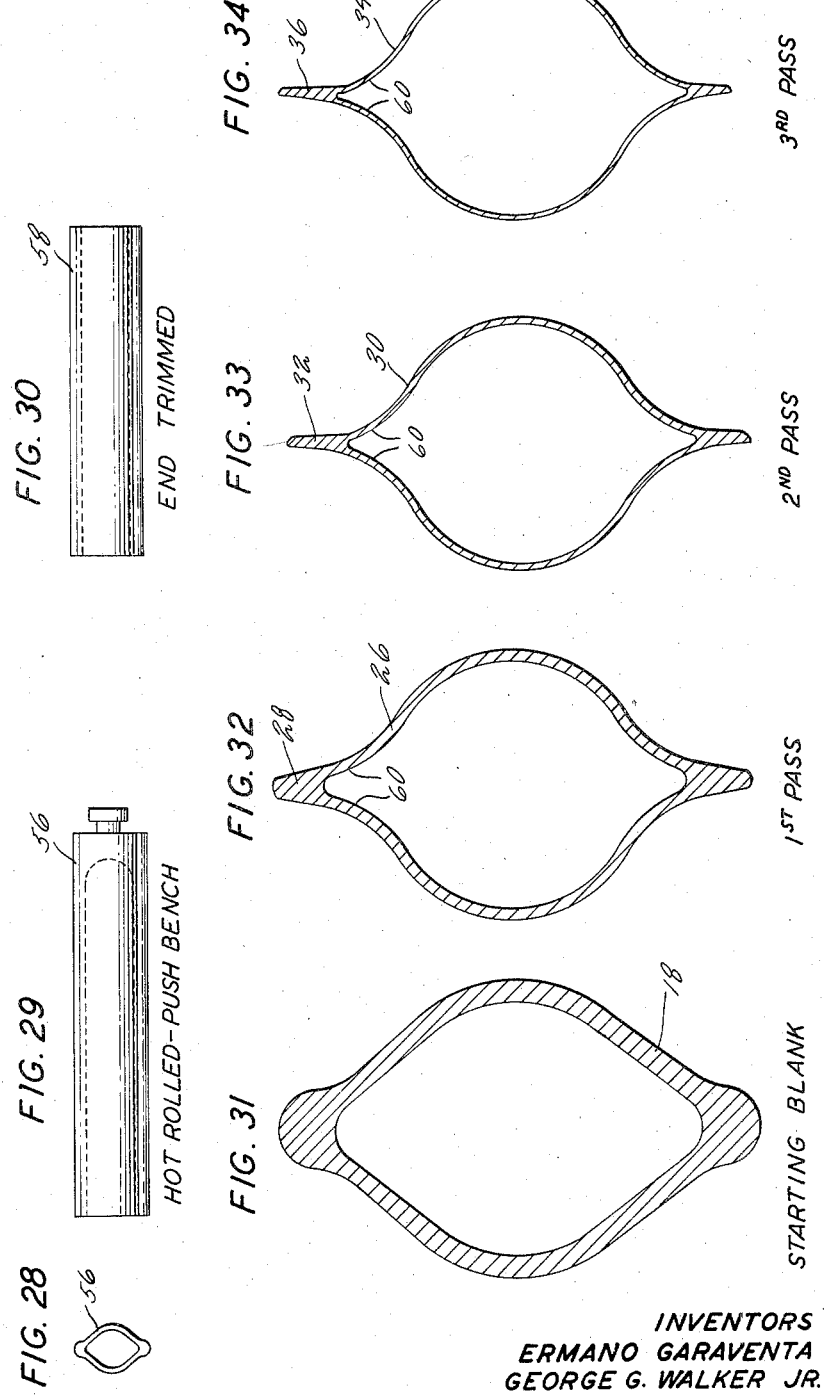

United States Patent Office 2,843,919
Patented July 22, 1958

2,843,919

COLD ROLLING METHOD OF MAKING HOLLOW STEEL BLADES

Ermano Garaventa and George G. Walker, Jr., Manchester, Conn., assignors to United Aircraft Corporation, East Hartford, Conn., a corporation of Delaware Application December 30, 1952, Serial No. 328,694

3 Claims. (Cl. 29—156.8)

This invention relates to a one-piece hollow metal propeller blade and particularly to an improved method of making the same.

An object of this invention is a simple and accurate method of making a one-piece hollow propeller blade.

A further object is a method of forming a one-piece hollow propeller blade with a minimum wall variation and the absence of cracks and folds.

A still further object is a method of making an accurate finned tube from which a propeller blade may be formed.

Other and further objects will be apparent from the following specification and the attached drawings in which:

Figs. 1 and 2 are end and side views respectively of a metal billet from which the blade is formed.

Figs. 3 and 4 are end and side views respectively of the billet after the piercing operation.

Figs. 5 and 7 are end views and Fig. 6 is a side view showing the pierced blank after the extrusion step.

Figs. 8 and 10 are end views and Fig. 9 is a side view showing the extruded blank after the shank end has been machined to provide uniform wall thickness.

Figs. 11 and 13 are end views and Fig. 12 is a side view of the machined blank of Fig. 9 after it has been cold rolled.

Figs. 14 and 15 are end and side views respectively of the shank end of the blade after it has been rounded.

Figs. 16 and 17 are end and side views respectively of the shank end of the blade after it has been machined and swaged.

Fig. 18 is a side view of the blade after the flattening operation.

Fig. 19 is a plan view of the blade after final forming including the twisting operation.

Figs. 20, 21 and 22 are sections, at the points indicated, of the finished blade.

Figs. 23 and 24 are end and side views respectively of a forging used in an alternative process of manufacturing a blank suitable for rolling.

Figs. 25 and 26 are end and side views respectively of a pierced forging.

Fig. 27 is a side view of the forging of Fig. 26 machined preparatory to forming it in a push bench mechanism.

Figs. 28 and 29 are end and side views respectively of the forging after the push bench operation.

Fig. 30 is a side view of the blank of Fig. 29 with the solid end removed to form the blank which may be rolled to form a tube similar to that shown in Fig. 12.

Fig. 31 is a cross section of the blank before the rolling operation.

Fig. 32 is a cross section of the blank formed by the first rolling step.

Fig. 33 is a cross section of the blank formed by the second rolling step.

Fig. 34 is a cross section of the blank after the third rolling step.

In the manufacture of one-piece hollow metal blades difficulty has been experienced in obtaining satisfactory uniform wall thickness and in the formation of the leading and trailing edges of the propeller blades. Wall thicknesses have varied at any given cross section so as to make it difficult to properly balance the blade and provide adequate strength and in forming the leading and trailing edges enough material could not be provided to properly form these edges. In order to overcome these difficulties and at the same time provide a commercially practicable method of making one-piece hollow steel or alloy blades, applicants have invented the process described herein.

In one aspect of this process a billet 10, which may be cylindrical forging as shown in Figs. 1 and 2, is heated and pierced to provide the substantially cylindrical tube 12 shown in Figs. 3 and 4. The pierced tube 12 is heated and extruded by means of a well known extrusion process to provide the blank 14 shown in Figs. 5, 6 and 7. In the extrusion step the blank 12 is extruded over a mandrel to provide the generally elliptically shaped aperture 16 extending through the entire blank. The extruded portion has a generally elliptical exterior surface 18 similar to the interior shape provided by the extruding mandrel so as to provide a tube of generally elliptical shape and of substantially uniform wall thickness with enlarged portions 20 forming fins extending longitudinally of the tube. These fins have a thickness with respect to the wall thickness of the blank such that the cross sectional area of both the walls and the fins will be reduced the same percentage of their original area in subsequent manipulations. In other words, if the fin of the finished tube from which the blade is to be made has a thickness of approximately twice the thickness of the wall thickness of the tube, the fin in the extruded blank 14 will have a thickness approximately twice the wall thickness of the extruded tube. The shank end 22 of the blank 14 may be left unextruded as shown in Fig. 6 and later contour machined to the same general contour as the remainder of the blank to give a wall and fin thickness at the shank end somewhat greater than the remainder of the blank as shown at 24 (Fig. 9) or the blank 14 may be placed in a second extrusion press and the enlarged portion 24 formed by using the same size mandrel as the original press but a larger die. The blank of Fig. 9 has a substantially straight elliptically shaped hole extending throughout its length and has an outside contour to give a tube of substantially uniform dimensions throughout its length except for the shank portion which is of slightly larger wall thickness.

The blank of Fig. 9 after heat treating to refine and spheroidize the grain structure of the steel is placed in a tube reducing or rolling machine and cold rolled to provide the blank shown in Figs. 11, 12 and 13. The tube reducing step cold reduces and shapes the tube by means of pressure exerted on the tube by a pair of oscillating shaped dies and a tapered internal mandrel. The equipment consists of the pair of shaped dies mounted on rolls that are capable of oscillating the dies by moving the roll centers back and forth in a linear direction. A stationary shaped mandrel is located between the die cavities. The rolls reciprocate in a path fixed with respect to the stationary mandrel. Only the tip of the tube is located between the dies at the start of the rolling operation, the working stroke of the rolls being toward the tip of the tube. The tube is fed over the mandrel and between the dies between each reciprocation so that the tube wall including the finned portions is reduced in thickness and also shaped as the work is advanced. By proper shaping of the dies, by stopping the operation at the proper location, and by the use of several dies, any tube wall taper within the capabilities of the machine may be obtained. Fig. 31 shows the section of the tube 18 as it is presented to the tube reducing machine. Fig. 32 shows the section after the first pass through the tube reducing rollers from which it will be noted that the wall sections 26 have been reduced about 50 percent and the thickness of the fins 28 have been reduced about 50 percent. In a blade about 78 inches long this rolling will provide the shape and size of the blank at about the 24 inch station. The rolls are shaped so that the blank will taper from about the 11 inch station to this 24 inch station. Due to the feeding of the blank between and beyond the dies the entire outboard portion of the blank will have been rolled by the portion of the dies that eventually form the 24 inch station so that the blank will be of substantially constant section outboard thereof. The second pass in the tube reducing machine overlaps the first pass by a short distance such as 1½ inches and provides a tapered wall 30 out to about the 47 inch station and a wall of substantially constant section the same as the 47 inch station outboard thereof. It will be noted that the wall 30 and the fin 32 as shown in Fig. 33 have again been proportionately reduced from that shown in Fig. 2. The third pass overlaps the second pass by a small distance such as 1½ inches and rolls the tapered wall out to about the 69 inch station. From there to the tip station which, in the blank used for purposes of illustration, was at about the 78 inch station, the tube section remained constant of the same section as at the 69 inch station. Between each of the three rolling passes, the tube is annealed to restore it to a workable state. In the steps enumerated thus far, it will be noted that the material for the fins is provided in the original extrusion and is made a definite proportion of the wall thickness in the original extrusion so as to not only provide the necessary metal for forming the fins but at the same time prevent any tearing or distortion due to unequal reduction in areas in the subsequent cold rolling operation.

After the rolling step the shank end 24 of the blade is machined to give a wall of uniform thickness, i. e. the additional metal which represented the finned portion is machined off. The fin is gradually faired from this machined section to the rolled shape at the 24 inch station. The elliptically shaped shank end 24 of the rolled blank shown in Fig. 12 is transformed from its uniform walled elliptical shape shown in Fig. 11 to the round shape shown in Fig. 14 by a hot pressing and expanding operation. The round shank 38 is formed from the uniform wall section 24 by first heating the shank end and pressing the section as shown in Fig. 11 across its larger dimension to transform it into a substantially square form. A round plug is then driven into this heated squared section to force it out to the round section shown in Fig. 14.

After this rounding step the blades are again heat treated to respheroidize them. Material is then gathered to form the necessary thickness for the blade retention by swaging the shank 38 to form the thickened section 40 of smaller diameter than the section 38.

After the swaging operation the shank ends are rough machined to provide the end 44 of Fig. 18 and the tube is then subjected to a flattening operation to provide the blade section 42 of Fig. 18. Although the merging of the wall sections into the finned section is on a relatively large radius which will minimize the formation of gutters or depressions in the outside of the blade 42 during the flattening operation, if desired, lead may be flowed into the regions of the reverse bends 60 (Figs. 32 to 34) where the wall section merges into the finned section to assist in holding the wall section out to the desired shape. This same function may be performed by the use of pressure such as hydraulic pressure on the interior of the blade during the pressing operation. This hydraulic pressure would act to force the tube walls out against the flattening dies and thus prevent the formation of gutters. This flattening operation is preferably a cold forming operation.

Following the flattening operation the leading and trailing edge fins are ground to airfoil shape and the blade tip 45 is seam welded closed. The blade is then heated and hot formed in the final forming and twisting dies to provide the blade sections 46 of Fig. 19 while the interior of the blade is filled with nitrogen under pressure. This hot forming step also acts as a die quenching and hardening step after which the blade is tempered.

The blade is now ready for the finishing steps of filling with a low density synthetic sponge and vapor blasting and polishing the exterior of the blade. The usual raceways in the shank are then rough machined, hardened and ground to provide the finished blade.

In the process above described the blank as shown in Fig. 9 suitable for cold rolling was formed by an extrusion process. A similar blank may be formed by a push bench process as shown in Figs. 23 to 30, the difference in the blanks being largely in the shank end. In the extrusion process additional material can be left at the shank for the purpose of forming the blade retention while in the push bench process, it is generally necessary to upset a portion of the blank to gather the additional material required for the blade retention although in the larger blade sizes there will be enough material in the comparatively large diameter tube so that the swaging operation in bringing the tube down to the proper retention diameter will increase the wall thickness sufficiently so that the upsetting operation could be eliminated.

In the push bench process of forming the tube blank a forged billet 48 of generally elliptical shape is utilized at the starting point. The billet is heated and pierced as shown in Fig. 26 and forms a shaped hole part way through the billet to form the blank 50 and simultaneously produce a finned area and to provide the extra material in the finned area 52. The solid end of the blank is machined to provide the necessary configuration for use in the push bench machine and provides the blank 54 shown in Fig. 27. The blank 54 is also machined to remove any irregularities produced by the piercing operation and give a uniform wall thickness to assure a finished tube with uniform walls. The blank 54 is placed on a shaped mandrel and pushed through a series of rolls of a push bench machine to form the outside contour. The push bench process consists of pushing a heated tubular blank through a series of rolls to form the outside contour with an internal mandrel to support the tube to form the inside contour and to control the wall thickness of the finished tube. Suitable equipment would consist of a hydraulic cylinder that is used to push the mandrel, over which the tube is placed, through one or more stands or groups of roll type dies. These dies change the tube shape and reduce the tube wall by means of pressure exerted against the mandrel. The mandrel may be tapered or substantially straight, allowing only taper enough to permit removal of the formed tube, depending only on the type of blank which is preferred for the cold rolling step. Due to the nature of the push bench process, the outside of the tube will be of uniform size throughout its length. The blank 56 as processed by the push bench step is shown in Figs. 28 and 29 from which it will be noted that the cross sectional area is substantially the same as the extruded blank shown in Fig. 10. Before the cold rolling step the solid end of the tube 56 is cut off to provide the tube 58 of Fig. 30 which is rolled and finished in the same manner as that above described in which a tube provided by the extruding process was used. After the rolling operation, if it is necessary to provide any additional material for the blade retention, the shank end may be upset to gather this material after or during the rounding operation and before the swaging step.

By the use of the combined processes of providing a formed tube with the enlarged fin areas of the correct proportion with respect to the wall thickness and then cold rolling this tube to provide a tube of tapering wall thickness and fin size, we have provided a process by which hollow steel or alloy blades may be accurately and quickly formed and many of the disadvantages such as varying wall thicknesses and cracked walls of prior attempts may be avoided.

Although only one modification of the invention has been shown and described herein, it will be apparent that various changes and modifications may be made in the various steps without departing from the scope of this novel concept.

What it is desired to secure by Letters Patent is:

1. The method of making a propeller blade comprising heating a metal tube, shaping the heated tube while supported on a shaped mandrel to provide a finned tube of generally elliptical shape with substantially uniform wall thickness and with solid finned portions of substantially uniform cross section and substantially greater thickness than said wall thickness extending lengthwise of the tube, cold rolling said finned tube while internally supported to reduce and taper the wall thickness and proportionally reduce and taper the fin thickness, removing a portion of the fin at the thicker end of said tube to provide a generally elliptical section with substantially uniform wall thickness including the finned portion, expanding the generally elliptical section into a round section, swaging said round section to gather material and increase the wall thickness, flattening and twisting the finned tube to shape the propeller blade.

2. The method of making a one-piece hollow metal propeller blade which comprises, piercing a heated billet to form a tube, heating the tube and shaping the exterior of the heated tube while supported on a mandrel to form a tube of generally elliptical shape having an exterior solid fin extending longitudinally thereof at the small end of the ellipse, said fin having a greater thickness than the tube wall thickness, cold rolling said finned tube over a mandrel to elongate the tube and reduce the fin and wall cross sectional areas proportionally and simultaneously tapering the finned tube, annealing said cold rolled tube, shaping the shank portion of said blade and pressing the finned tube to form the blade shape and then finishing the propeller blade.

3. The method of making one-piece hollow metal propeller blades which comprises, piercing a billet to form a tube, extruding the tube to provide an exterior solid fin extending lengthwise of the tube of greater thickness than the tube walls, cold rolling said finned tube to elongate and taper the tube and reduce and taper the wall and fin thickness of the tube, shaping the thick end of said tube to provide a substantially cylindrical shank end by removing a portion of the fin to provide a substantially uniform wall thickness, rounding out the section by first pressing it to a substantially square shape with the finned portion in two of the corners and then expanding the squared portion into a rounded portion, then swaging said rounded portion and machining the shank to rough size, closing the other end of the tube by welding, then flattening and twisting the finned tube to finish shape the blade and then finish machining said shank.

References Cited in the file of this patent

UNITED STATES PATENTS

| | | |
|---|---|---|
| 1,786,571 | Lonsdale | Dec. 30, 1930 |
| 2,044,293 | Handler | June 16, 1936 |
| 2,138,127 | Squires | Nov. 29, 1938 |
| 2,266,858 | Gehret | Dec. 23, 1941 |
| 2,312,094 | Harmon | Feb. 23, 1943 |
| 2,312,095 | Weltz | Feb. 23, 1943 |
| 2,394,446 | Handler | Feb. 5, 1946 |
| 2,485,534 | Mayne et al. | Oct. 18, 1949 |